(12) United States Patent
Bell

(10) Patent No.: US 12,702,229 B2
(45) Date of Patent: Aug. 11, 2026

(54) MODULATED CARGO MOUNTING TRACK SYSTEM

(71) Applicant: Tactical-EV L.L.C., Rapid City, SD (US)

(72) Inventor: Ian Bell, Rapid City, SD (US)

(73) Assignee: Tactical-EV L.L.C., Rapid City, SD (US)

( * ) Notice: Subject to any disclaimer, the term of this patent is extended or adjusted under 35 U.S.C. 154(b) by 159 days.

(21) Appl. No.: 18/475,659

(22) Filed: Sep. 27, 2023

(65) Prior Publication Data

US 2025/0098853 A1 Mar. 27, 2025

(51) Int. Cl.

*B60R 7/14* (2006.01)
*A47B 81/00* (2006.01)
*B60R 5/02* (2006.01)

(52) U.S. Cl.

CPC .............. *A47B 81/005* (2013.01); *B60R 5/02* (2013.01)

(58) Field of Classification Search

CPC ................. B60R 7/14; B60R 2011/008; B60R 2011/0036; B60R 7/02; B60R 5/02; A47B 81/005; F41C 33/06

See application file for complete search history.

(56) References Cited

U.S. PATENT DOCUMENTS 4,364,499 A 12/1982 McCue
5,531,368 A 7/1996 Morford
7,913,957 B2 * 3/2011 Nelson .................... F16B 21/02 248/65
8,186,188 B1 5/2012 Brown
10,252,678 B2 * 4/2019 Hull .................. A47B 96/1483
10,576,900 B2 * 3/2020 Bornais .................. F41A 23/18
11,073,352 B1 7/2021 Radcliff
11,554,722 B1 1/2023 Mothersele
(Continued)

FOREIGN PATENT DOCUMENTS

KR 20230059302 A 5/2023
WO 2023077098 A1 5/2023

OTHER PUBLICATIONS

Tesla Model 3: Secure Frunk For Firearm Storage, Feb. 18, 2022, https://www.youtube.com/watch?v=aSrGiorjsvE.

*Primary Examiner* — Adam J Waggenspack
(74) *Attorney, Agent, or Firm* — Goodhue, Coleman & Owens, P.C.

(57) ABSTRACT

A modulated mounting track system and method are disclosed. The modulated mounting track includes, for example, a mounting track having an elongated rail with at least one elongated slot and one or more mounting points and a mounting attachment having an accessory docking port terminating in a track mounting end with a docking channel configured to removably mate with the elongated slot in the mounting track. The mounting attachment includes a locked and an unlocked position for removably mating the mounting attachment to the mounting track and to secure the mounting attachment from being unintentionally dislodged. A frunk of an electric vehicle having a modulated mounting track is disclosed. Accessories are stowed in modulated accessory mounting attachments removably and securely attached to a mounting track. Firearm and firearm accessories are stowed in modulated firearm and accessory mounting attachments removably and securely attached to a mounting track.

6 Claims, 21 Drawing Sheets

(56) References Cited

U.S. PATENT DOCUMENTS

| | | | | |
|---|---|---|---|---|
| 2014/0175243 | A1* | 6/2014 | Sivak | B43L 1/00<br>248/316.1 |
| 2015/0354611 | A1 | 12/2015 | Wasankari | |
| 2017/0350672 | A1 | 12/2017 | Masteller | |
| 2021/0053498 | A1 | 2/2021 | Howard, II | |
| 2022/0289113 | A1 | 9/2022 | Salter | |
| 2023/0202398 | A1 | 6/2023 | Huggett | |
| 2023/0219629 | A1 | 7/2023 | Vahle | |

* cited by examiner 50
74
64
52
68
60
96
96
94
98
54

MODULATED CARGO MOUNTING TRACK SYSTEM

FIELD OF THE INVENTION

The present invention relates to a modulated cargo mounting system. More particularly, but not exclusively, the present invention relates to a modulated cargo mounting track system for electric vehicles and garages.

BACKGROUND

Electric vehicles (EV) are quickly gaining popularity. Consumers of EVs range from the general populus to commercial use. Law enforcement and the military also have begun to use EVs. Unlike all other vehicles, except for the rare rear-engine combustion vehicle, EVs have a "frunk" or a front trunk. The front trunk is quickly and easily accessible and is the most safe and secure location in the vehicle. The front trunk of an EV is typically roomy enough to temporarily house or and securely store longer items. Unlike a traditional vehicle gun rack that is difficult to access, is comparably unsafe, and does not conceal/hide the gun from onlookers, the frunk of an EV is an ideal location for quickly accessing, securely and safely storing firearms. Therefore, what is needed is a modulated cargo mounting system for the frunk of an EV and the garage housing the EV.

SUMMARY

Therefore, it is a primary object, feature, or advantage of the present invention to improve over the state of the art.

It is a further object, feature, or advantage of the present invention to provide a modulated cargo mounting system for an EV.

It is a still further object, feature, or advantage of the present invention to provide a modulated cargo mounting system for a vehicle garage, such as an EV garage.

Another object, feature, or advantage is to provide a modulated firearms mounting track system.

Yet another object, feature, or advantage is to provide a modulated firearms mounting track system for a frunk of an EV.

Still another object, feature, or advantage is to provide a modulated firearms mounting track system for a garage, such as an EV garage.

One other object, feature, or advantage is to provide a modulated firearm accessory mounting track system for the frunk of an EV.

At least one other object, feature, or advantage is to provide a modulated firearm accessory mounting track system for a garage, such as an EV garage.

Yet other objects, features, or advantages are to provide a modulated cargo, firearm and firearm accessory mounting track system whereby objects can be safely, quickly, and securely stowed and retrieved.

In at least one aspect, a modulated mounting track system is disclosed. The modulated mounting track system includes, for example, a mounting track having an elongated rail with at least one elongated slot and one or more mounting points and a mounting attachment having an accessory docking port terminating in a track mounting end with a docking channel configured to removably mate with the elongated slot in the mounting track. The mounting attachment includes a locked and an unlocked position for removably mating the mounting attachment to the mounting track and to secure the mounting attachment from being unintentionally dislodged.

In one other aspect, an electric vehicle is disclosed having a frunk with a modulated mounting track system of the present invention is disclosed. The electric vehicle includes a mounting track secured to an interior wall within the frunk and a mounting attachment having an accessory docking port terminating in a track mounting end configured to removably mate with the mounting track within the frunk. The mounting attachment includes a locked and an unlocked position for removably mating the accessory to the mounting track within the frunk and to secure the mounting attachment from being unintentionally dislodged during movement of the electric vehicle.

In at least one other aspect, a modulated mounting track method is disclosed. The modulated mounting track system includes, such steps, for example, as providing a mounting track and a mounting attachment, mounting the mounting track to a wall, removably attaching the mounting attachment to the mounting track, and removably securing an accessory to the mounting track by removably securing a portion of the accessory to the mounting attachment.

In at least another aspect, a modulated firearms mounting track system is disclosed. The modulated firearms mounting track system includes, for example, a mounting track having an elongated rail having at least one elongated slot and one or more mounting points and a firearm mounting attachment including a firearm or firearm accessory docking port terminating in a track mounting end having a docking channel configured to removably mate with the elongated slot in the mounting track. The firearm mounting attachment includes a locked and an unlocked position for removably mating the firearm or firearm accessory to the mounting track and to secure the firearm mounting attachment from being unintentionally dislodged.

In still one other aspect, an electric vehicle is disclosed. The electric vehicle includes a frunk having a modulated firearms mounting track system that includes a mounting track secured to an interior wall within the frunk and a firearm mounting attachment having a firearm or firearm accessory docking port terminating in a track mounting end configured to removably mate with the mounting track within the frunk. The firearm mounting attachment has a locked and an unlocked position for removably mating the firearm or firearm accessory to the mounting track within the frunk and to secure the firearm mounting attachment from being unintentionally dislodged during movement of the electric vehicle.

In yet another aspect, a modulated firearms mounting track method is disclosed. The method includes, such steps, for example, as providing a mounting track and a firearm mounting attachment, mounting the mounting track to a wall, removably attaching the firearm mounting attachment to the mounting track, removably securing a firearm or firearm accessory to the mounting track by removably securing a magazine, slide of a firearm, firearm grip, or other portion of the firearm within the firearm mounting attachment.

One or more of these and/or other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by any objects, features, or advantages stated herein.

BRIEF DESCRIPTION OF THE DRAWINGS

Illustrated embodiments of the disclosure are described in detail below with reference to the attached drawing figures, which are incorporated by reference herein.

DETAILED DESCRIPTION

FIGS. 1-37 disclose various aspects of a modulated mounting track system 10, a mounting surface 102 of a storage environment 100 with a modulated mounting track system 10 and an electric vehicle ("EV") 150 with a modulated mounting track system 10 in accordance with one or more of the illustrative aspects of the present invention. Although, various environments for the modulated mounting track system 10 are shown and discussed, the present application contemplates the modulated mounting track system being mountable to any surface where quick, safe, and secure modulated storage of one or more items is desired.

Figure 1:
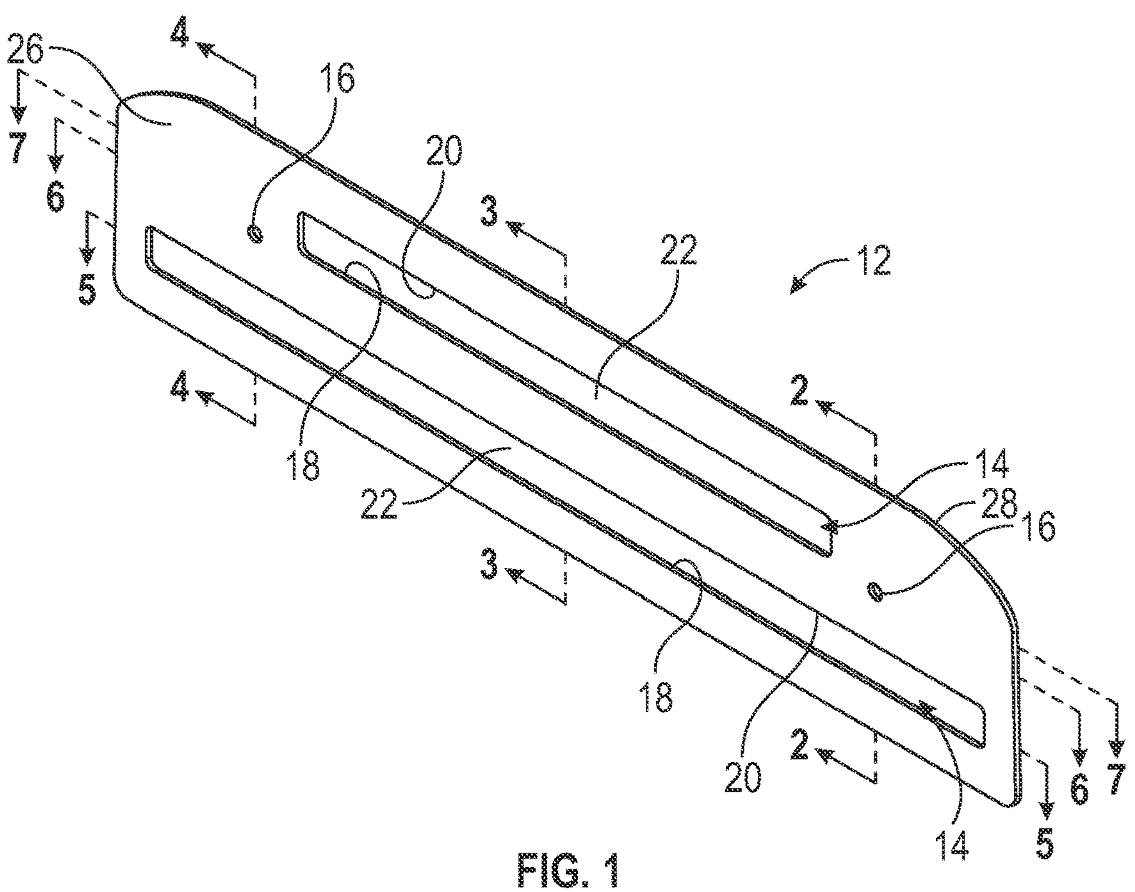
FIG. 1 is a perspective view of a mounting track in accordance with an illustrative aspect of the present invention.
Figure 2:
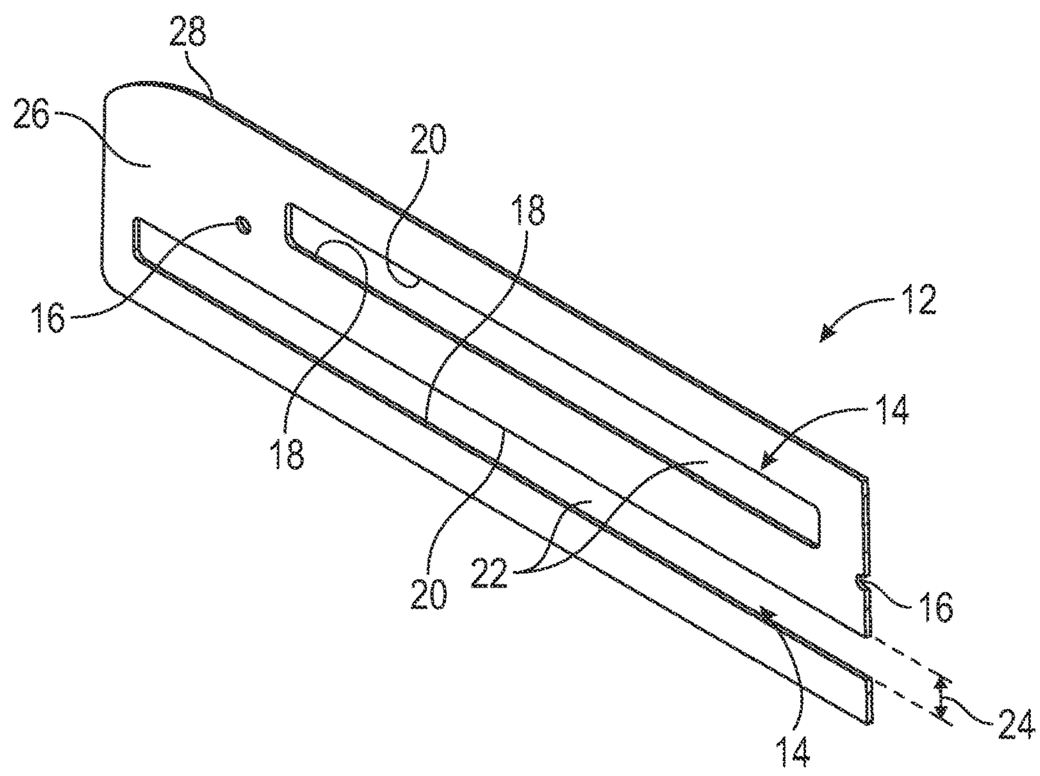
FIG. 2 is a cross section view of the mounting track taken along line 2-2 shown in FIG. 1.
Figure 3:
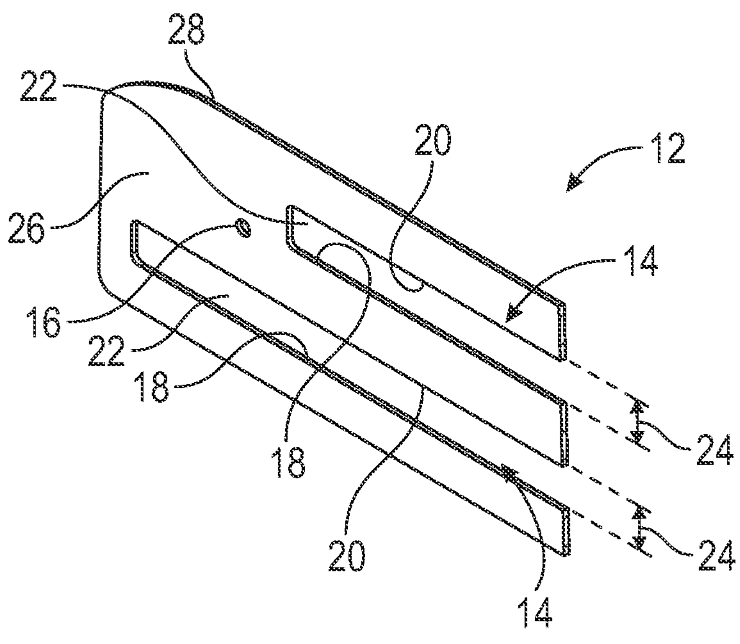
FIG. 3 is a cross section view of the mounting track taken along line 3-3 shown in FIG. 1.
Figure 4:
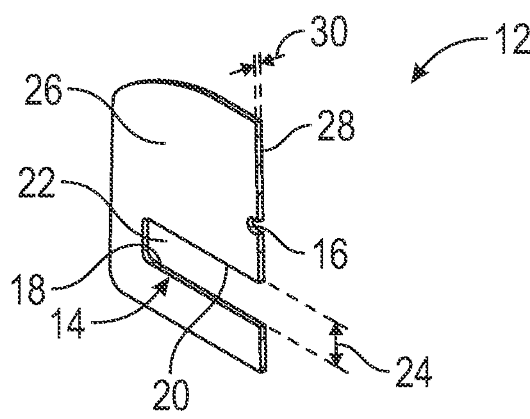
FIG. 4 is a cross section view of the mounting track taken along line 4-4 shown in FIG. 1.
Figure 5:
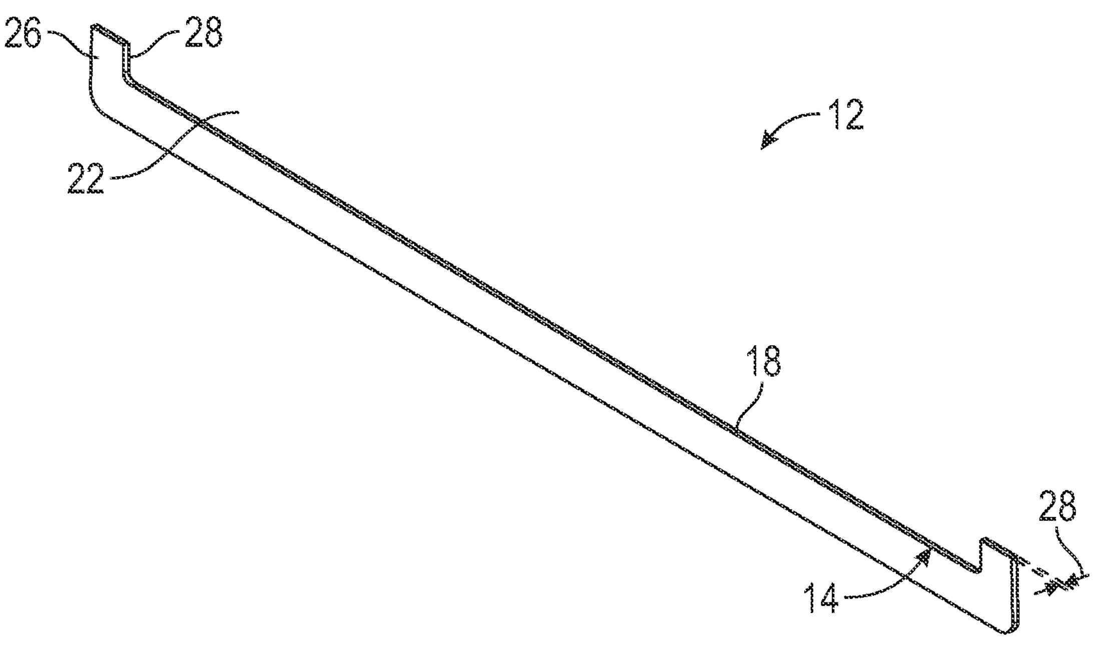
FIG. 5 is a cross section view of the mounting track taken along line 5-5 shown in FIG. 1.
Figure 6:
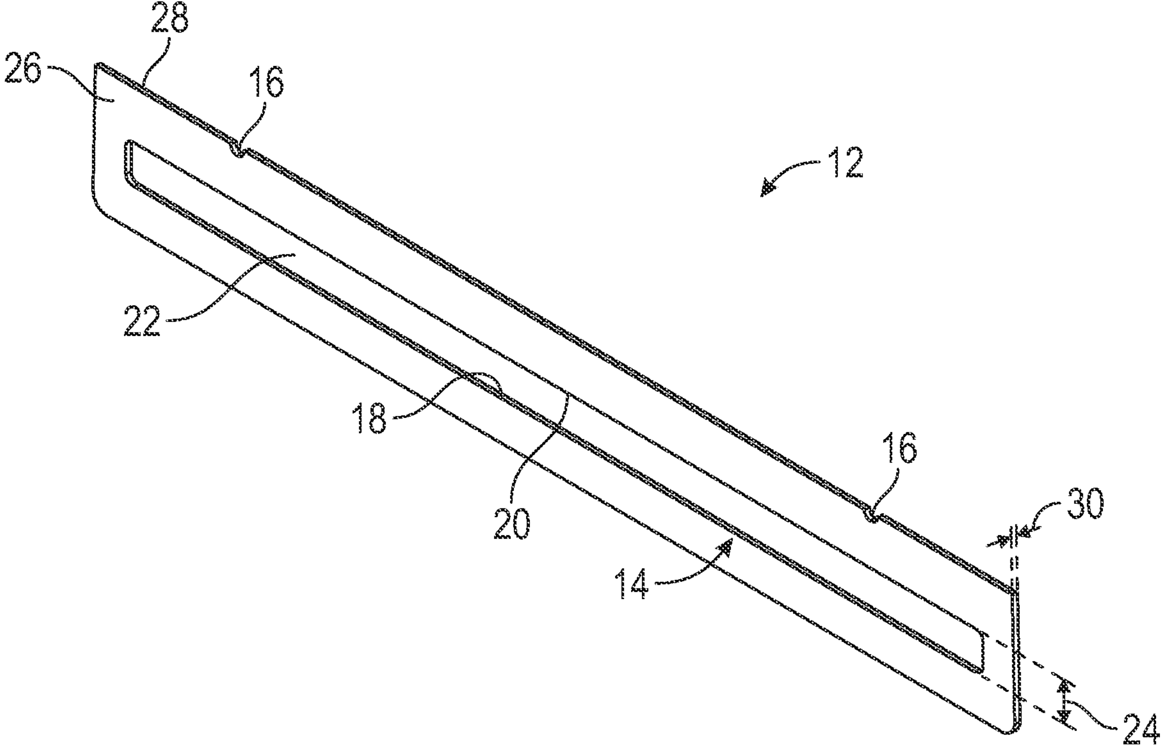
FIG. 6 is a cross section view of the mounting track taken along line 6-6 shown in FIG. 1.
Figure 7:
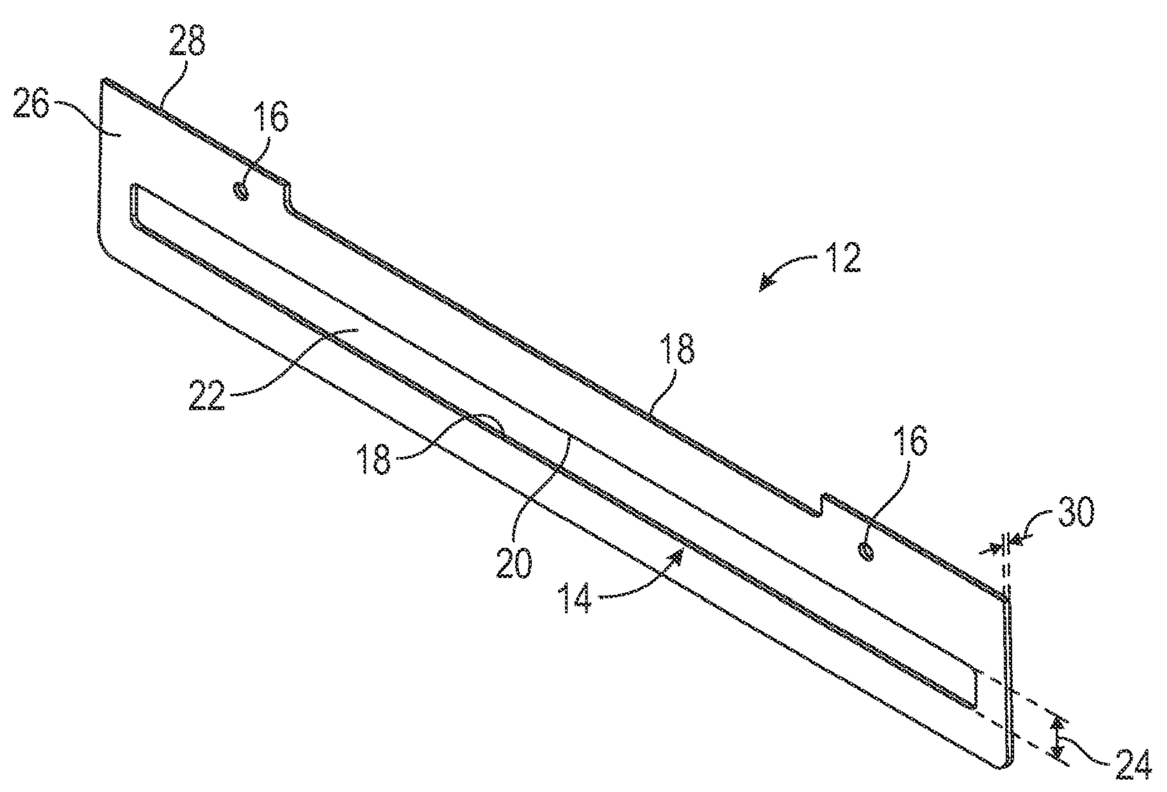
FIG. 7 is a cross section view of the mounting track taken along line 7-7 shown in FIG. 1.
Figure 8:
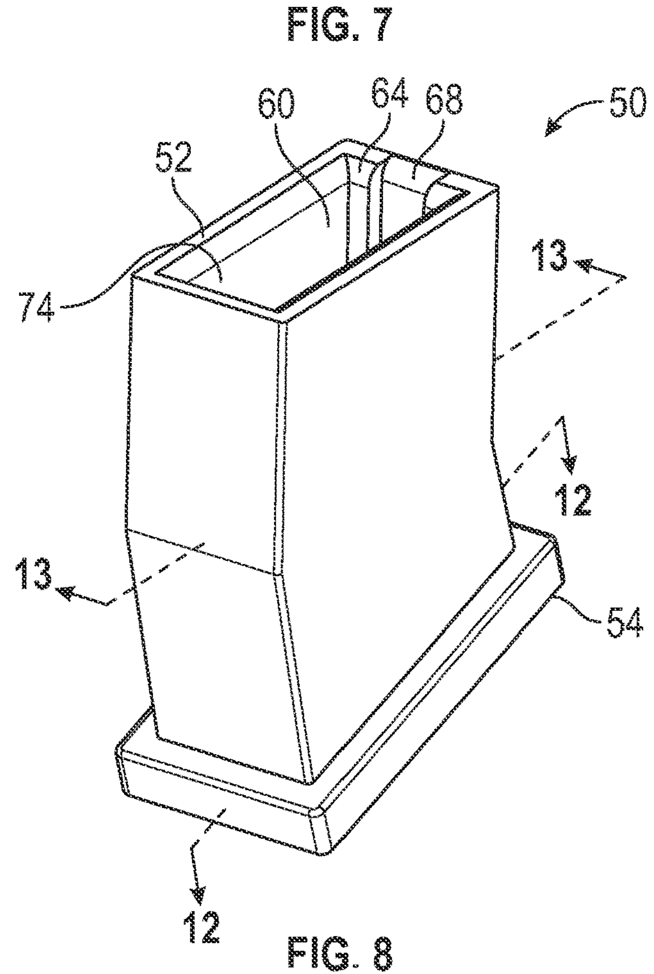
FIG. 8 is a front perspective view of a modulated mounting attachment in accordance with an illustrative aspect of the present invention.
Figure 9:
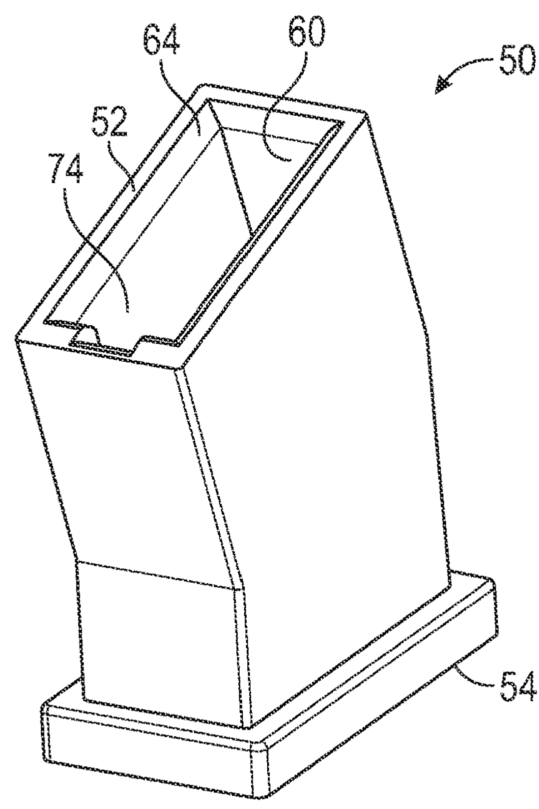
FIG. 9 is a rear perspective view of a modulated mounting attachment in accordance with an illustrative aspect of the present invention.
Figure 10:
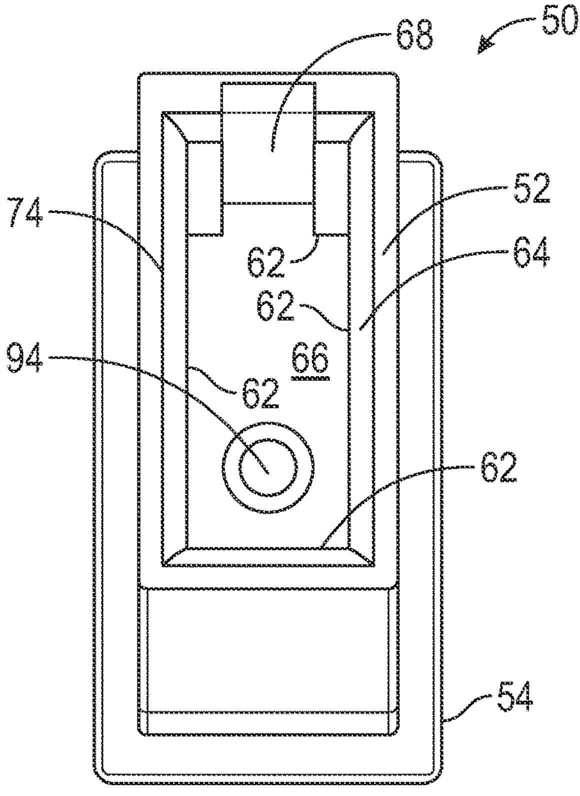
FIG. 10 is a top view of a modulated mounting attachment in accordance with an illustrative aspect of the present invention.
Figure 11:
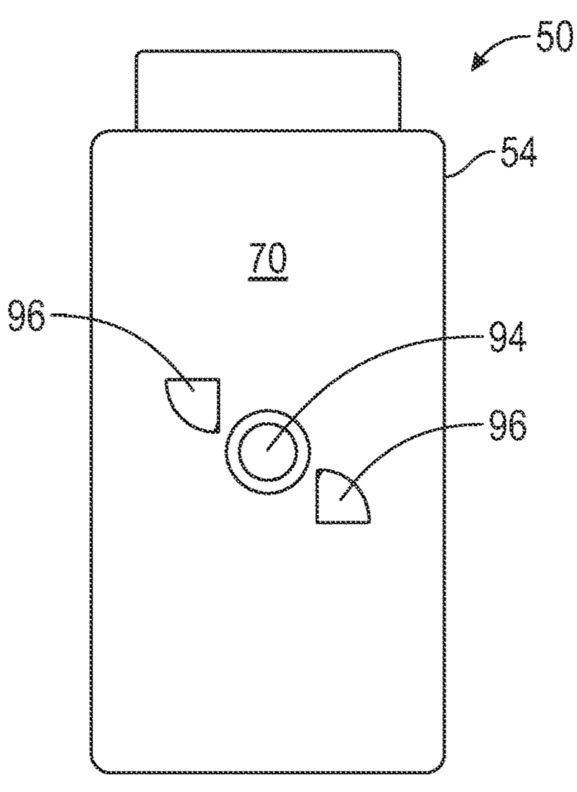
FIG. 11 is a bottom view of a modulated mounting attachment in accordance with an illustrative aspect of the present invention.
Figure 12:
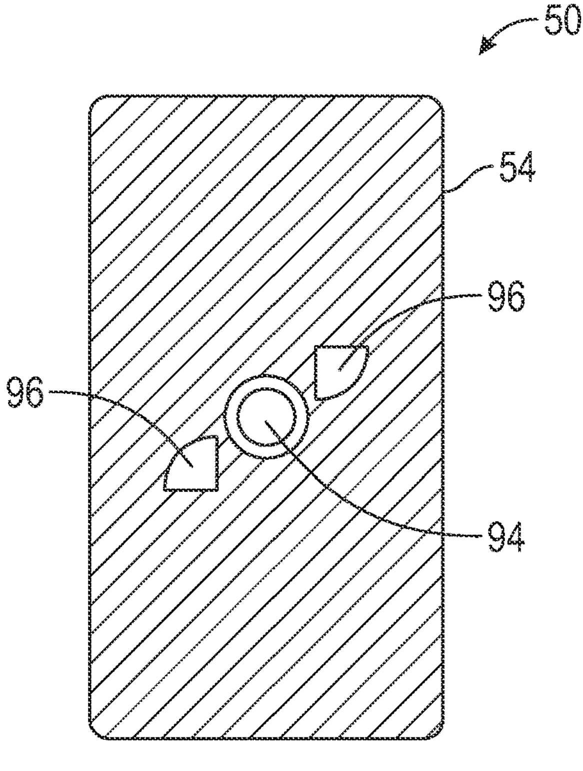
FIG. 12 is a cross section view of the modulated mounting attachment taken along line 12-12 shown in FIG. 8.
Figure 13:
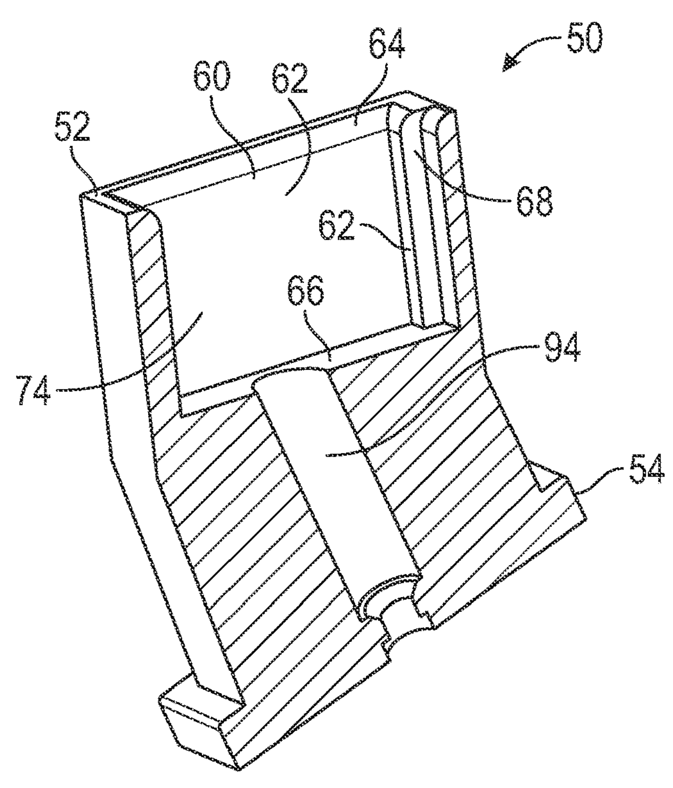
FIG. 13 is a cross section view of the modulated mounting attachment taken along line 13-13 shown in FIG. 8.
Figure 14:
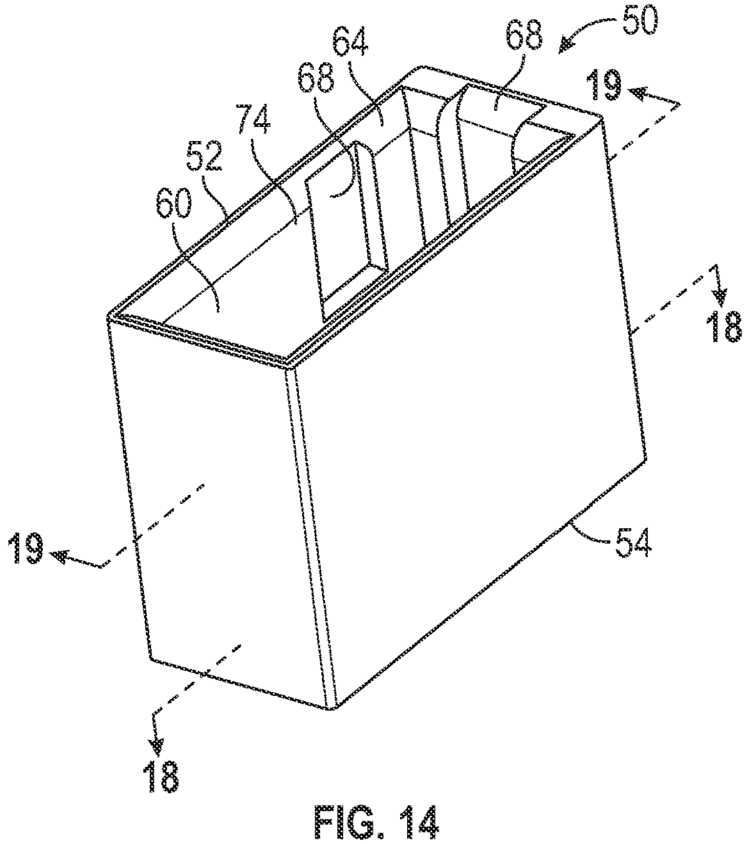
FIG. 14 is a front perspective view of modulated accessory mounting attachment in accordance with an illustrative aspect of the present invention.
Figure 15:
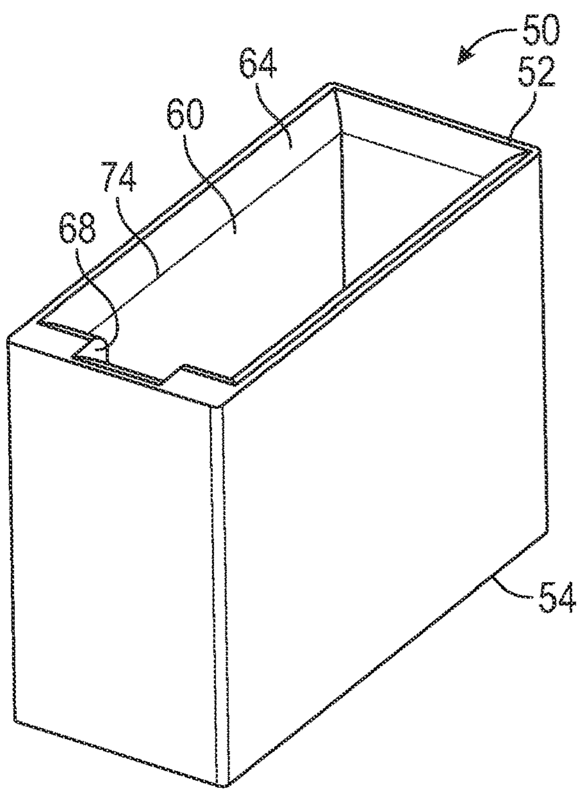
FIG. 15 is a rear perspective view of a modulated accessory mounting attachment in accordance with an illustrative aspect of the present invention.
Figure 16:
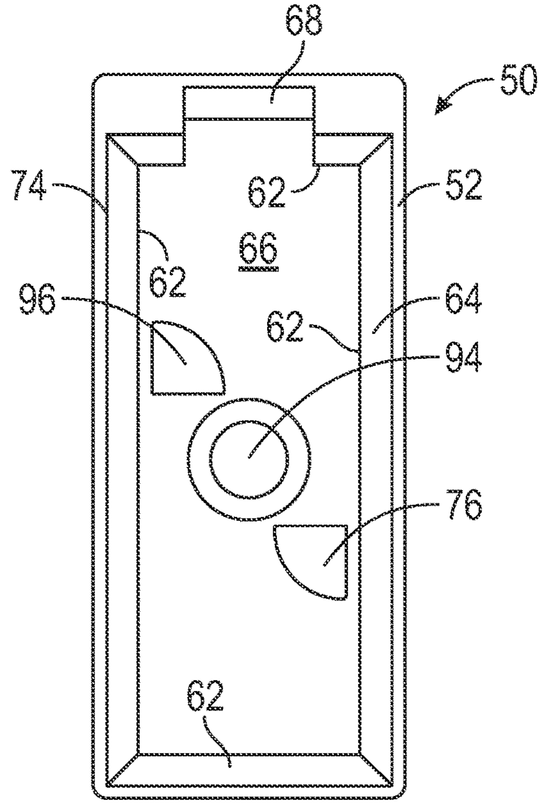
FIG. 16 is a top view of a modulated accessory mounting attachment in accordance with an illustrative aspect of the present invention.
Figure 17:
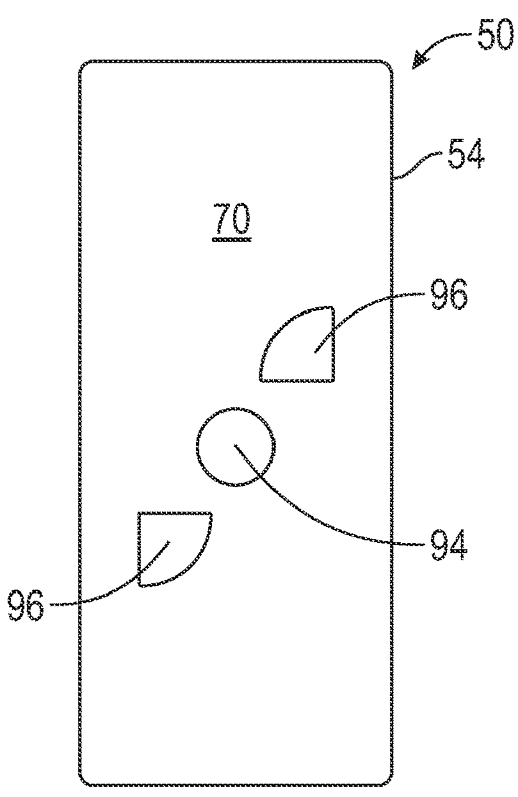
FIG. 17 is a bottom view of a modulated accessory mounting attachment in accordance with an illustrative aspect of the present invention.
Figure 18:
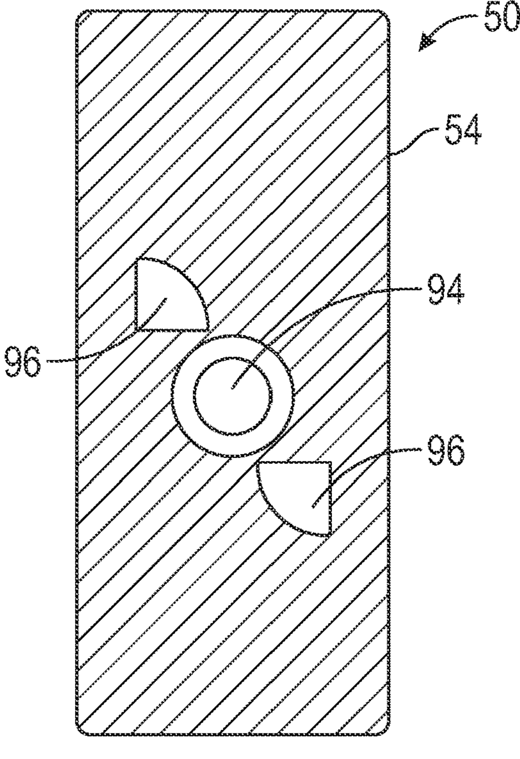
FIG. 18 is a cross section view of the modulated accessory mounting attachment taken along line 18-18 shown in FIG. 14.
Figures 19, 20:
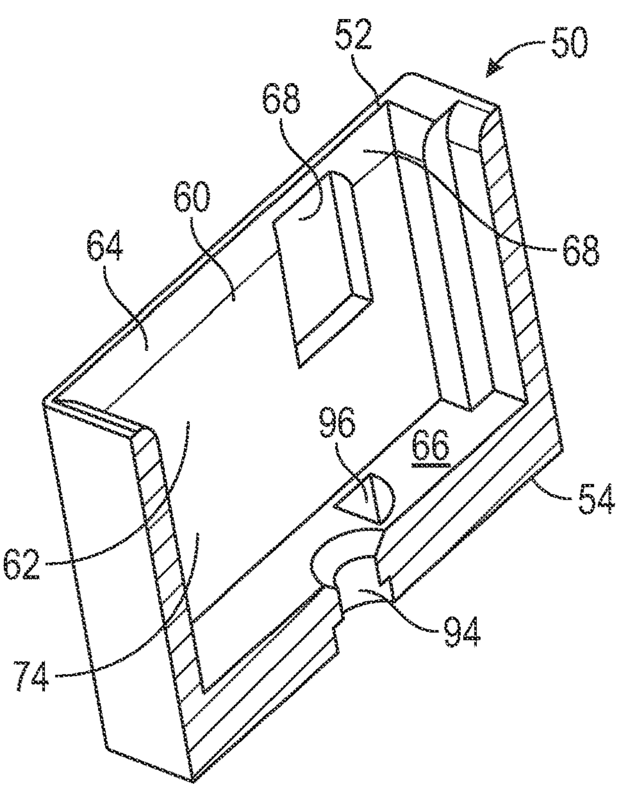
FIG. 19 is a cross section view of the modulated accessory mounting attachment taken along line 19-19 shown in FIG. 14.
FIG. 20 is a front perspective view of a modulated firearm mounting attachment in accordance with an illustrative aspect of the present invention.
Figures 21, 22:
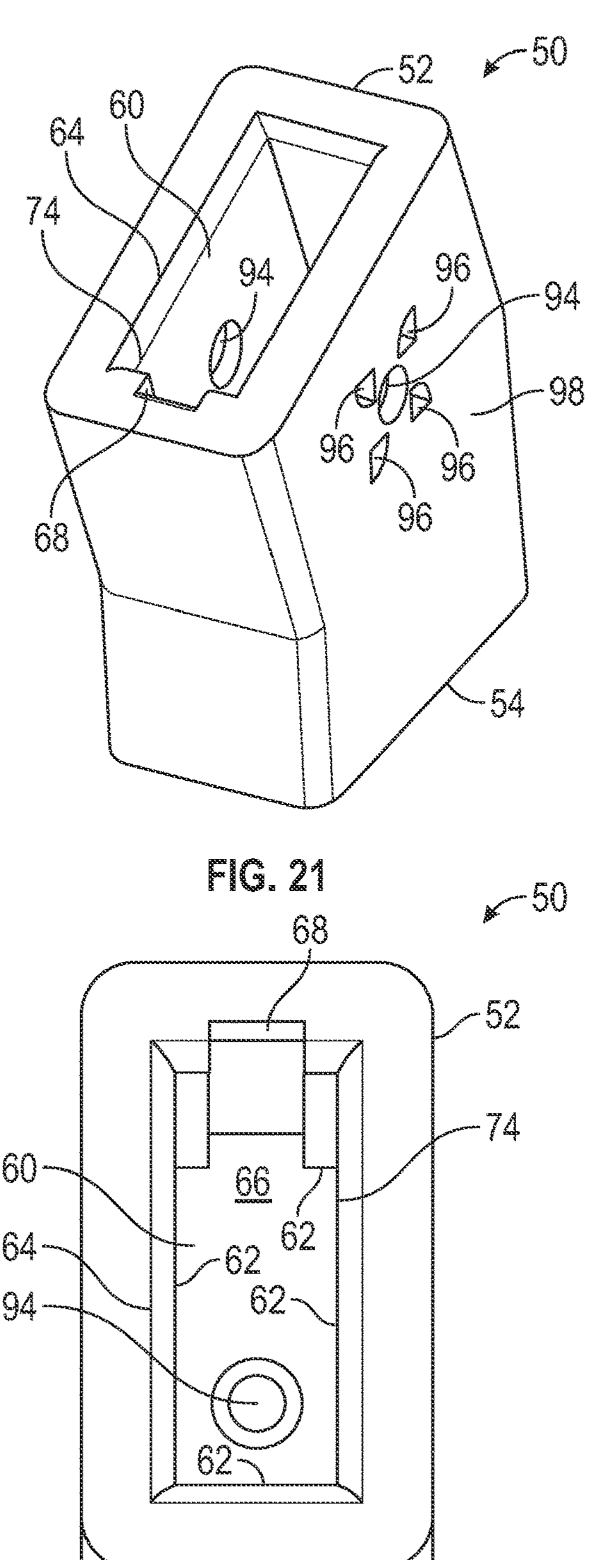
FIG. 21 is a rear perspective view of a modulated firearm mounting attachment in accordance with an illustrative aspect of the present invention.
FIG. 22 is a top view of a modulated firearm mounting attachment in accordance with an illustrative aspect of the present invention.
Figure 23:
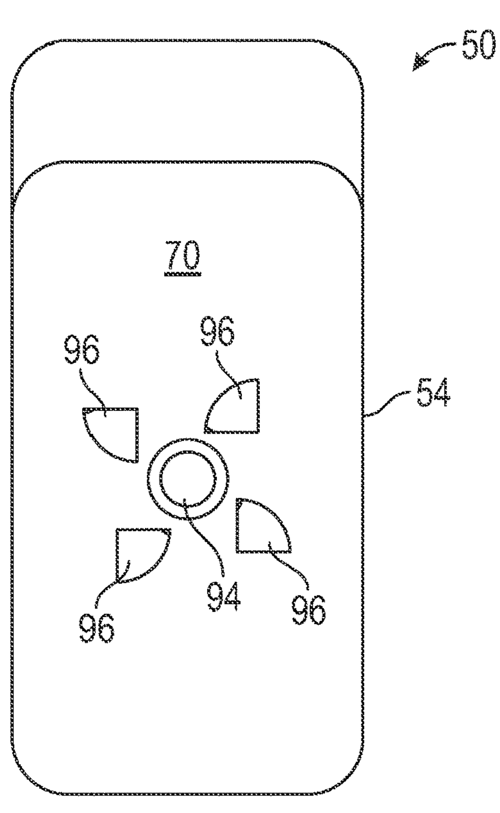
FIG. 23 is a bottom view of a modulated firearm mounting attachment in accordance with an illustrative aspect of the present invention.
Figure 24:
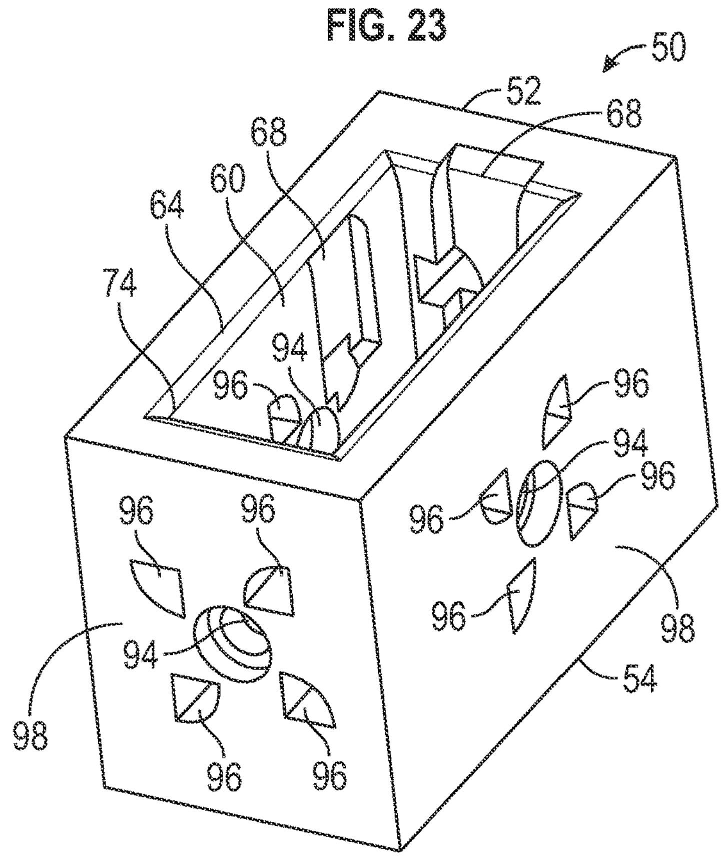
FIG. 24 is a front perspective view of a modulated firearm accessory mounting attachment in accordance with an illustrative aspect of the present invention.
Figure 25:
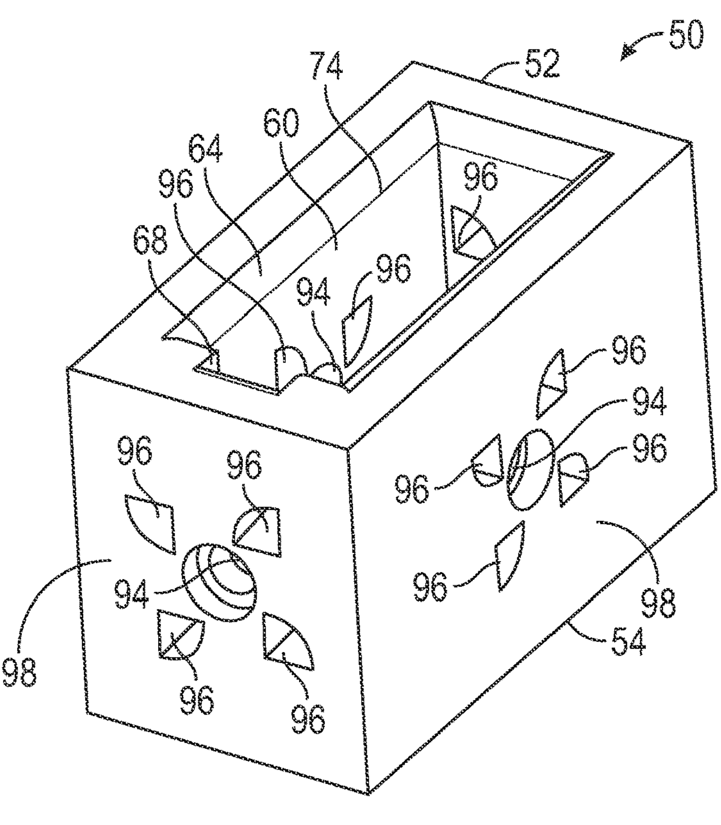
FIG. 25 is a rear perspective view of a modulated firearm accessory mounting attachment in accordance with an illustrative aspect of the present invention.
Figure 26:
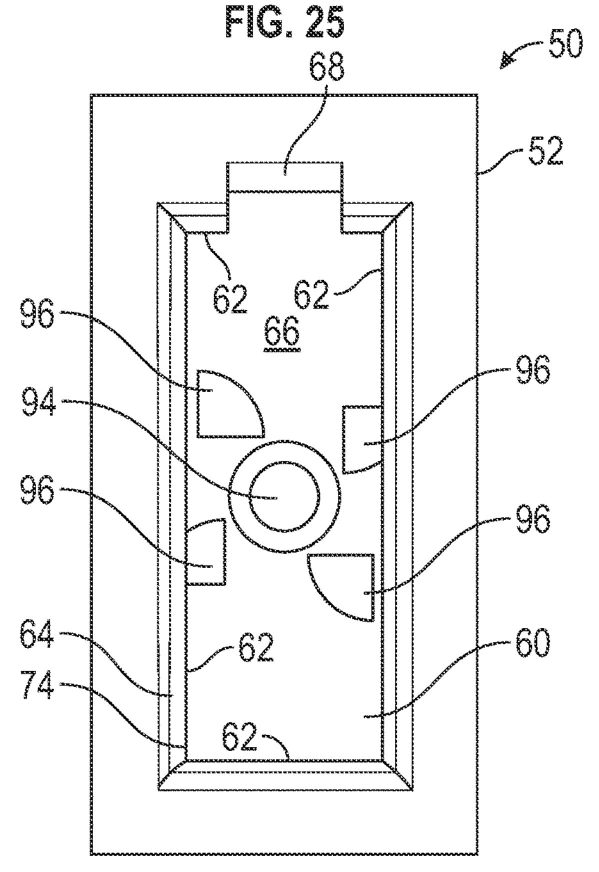
FIG. 26 is a top view of a modulated firearm accessory mounting attachment in accordance with an illustrative aspect of the present invention.
Figure 27:
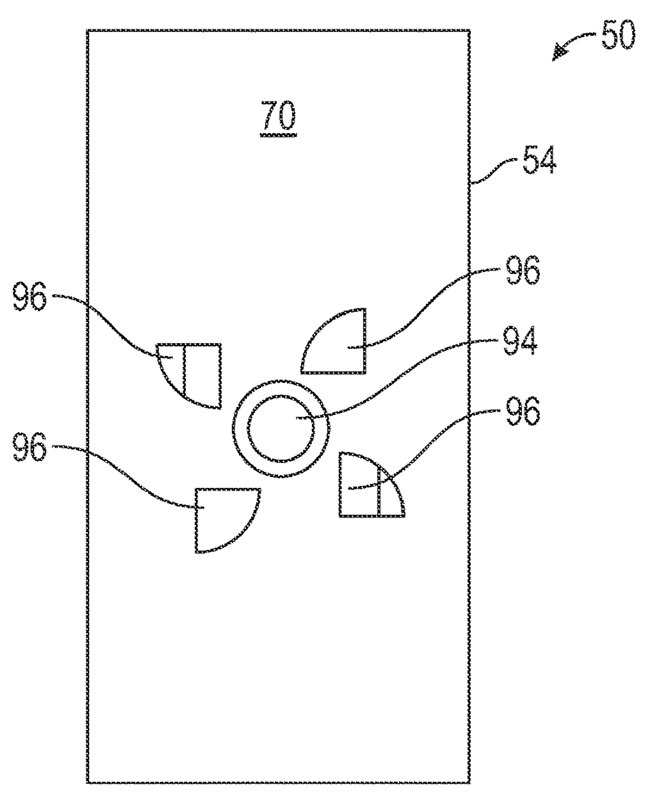
FIG. 27 is a bottom view of a modulated firearm accessory mounting attachment in accordance with an illustrative aspect of the present invention.
Figure 28:
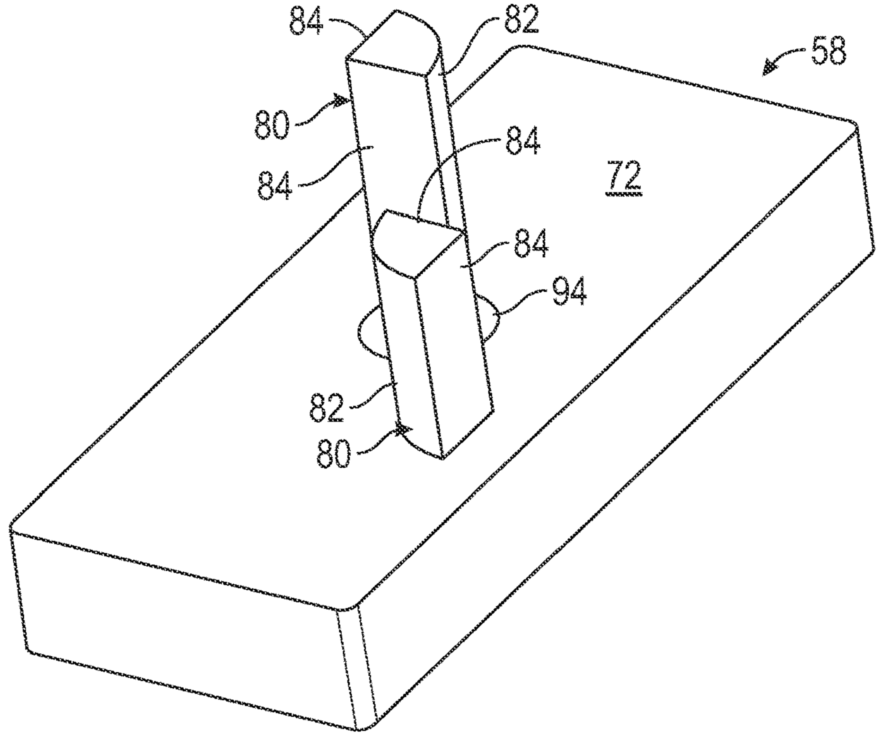
FIG. 28 is a front perspective view of a mounting plate in accordance with an illustrative aspect of the present invention.
Figure 29:
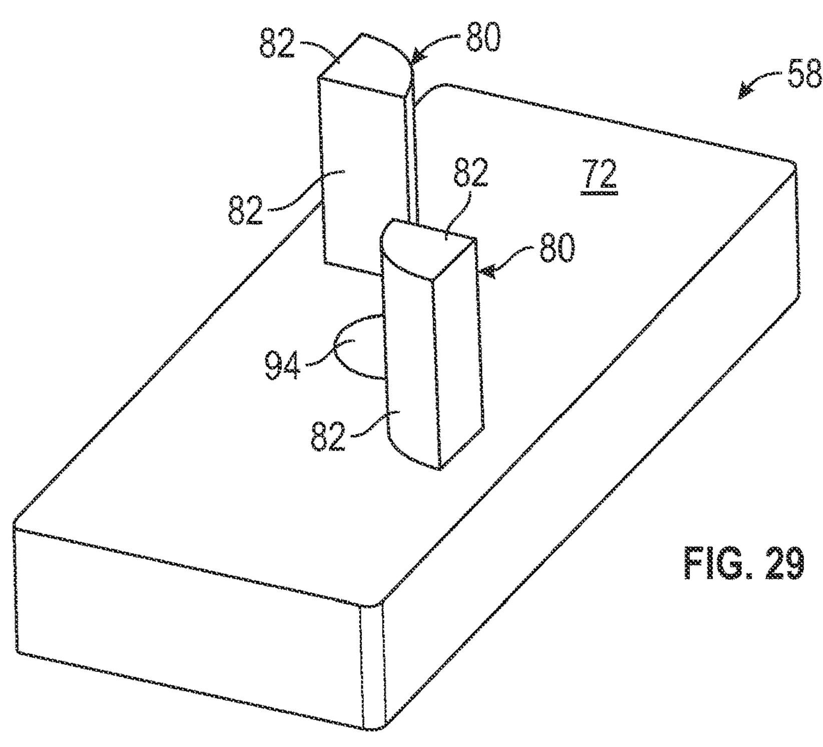
FIG. 29 is a rear perspective view of a mounting plate in accordance with an illustrative aspect of the present invention.
Figure 30:
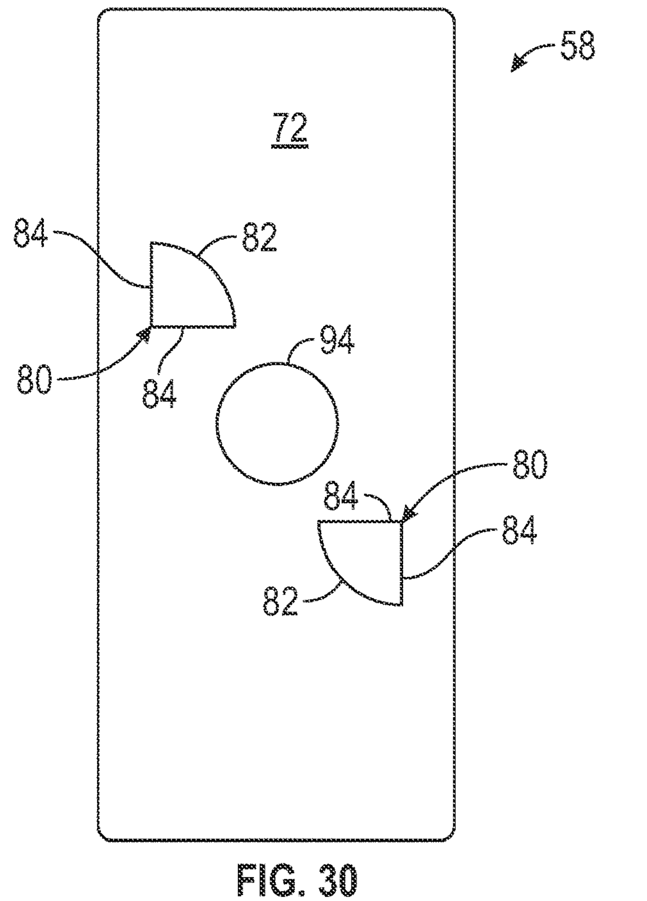
FIG. 30 is a top view of a mounting plate in accordance with an illustrative aspect of the present invention.
Figure 31:
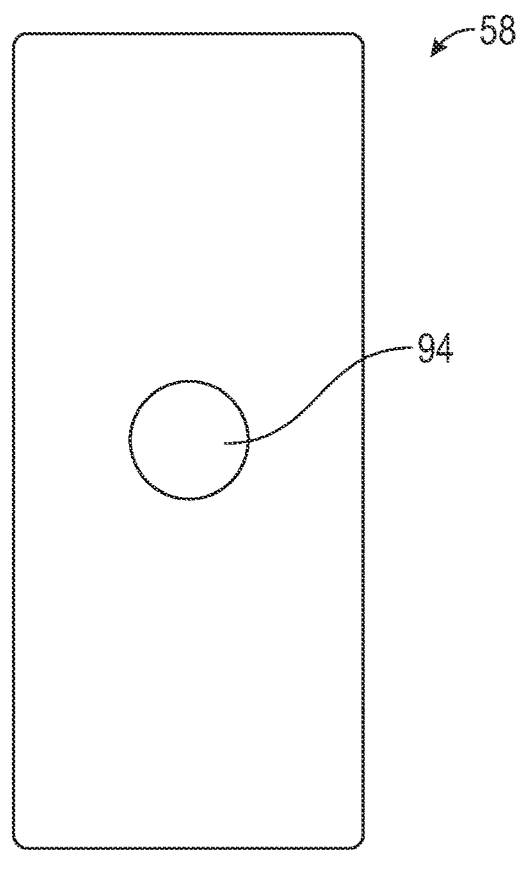
FIG. 31 is a bottom view of a mounting plate in accordance with an illustrative aspect of the present invention.
Figure 32:
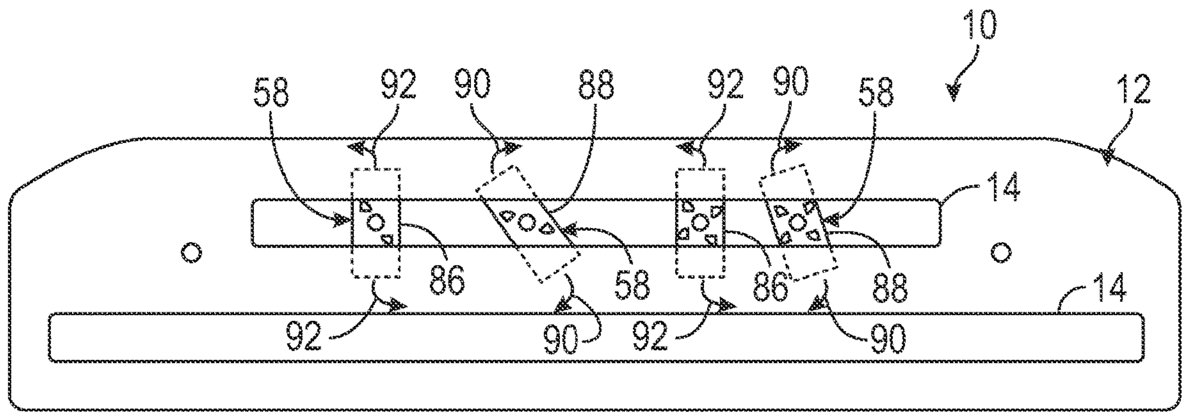
FIG. 32 is a top view of the mounting plate and the mounting track shown in accordance with an illustrative aspect of the present invention.
Figure 33:
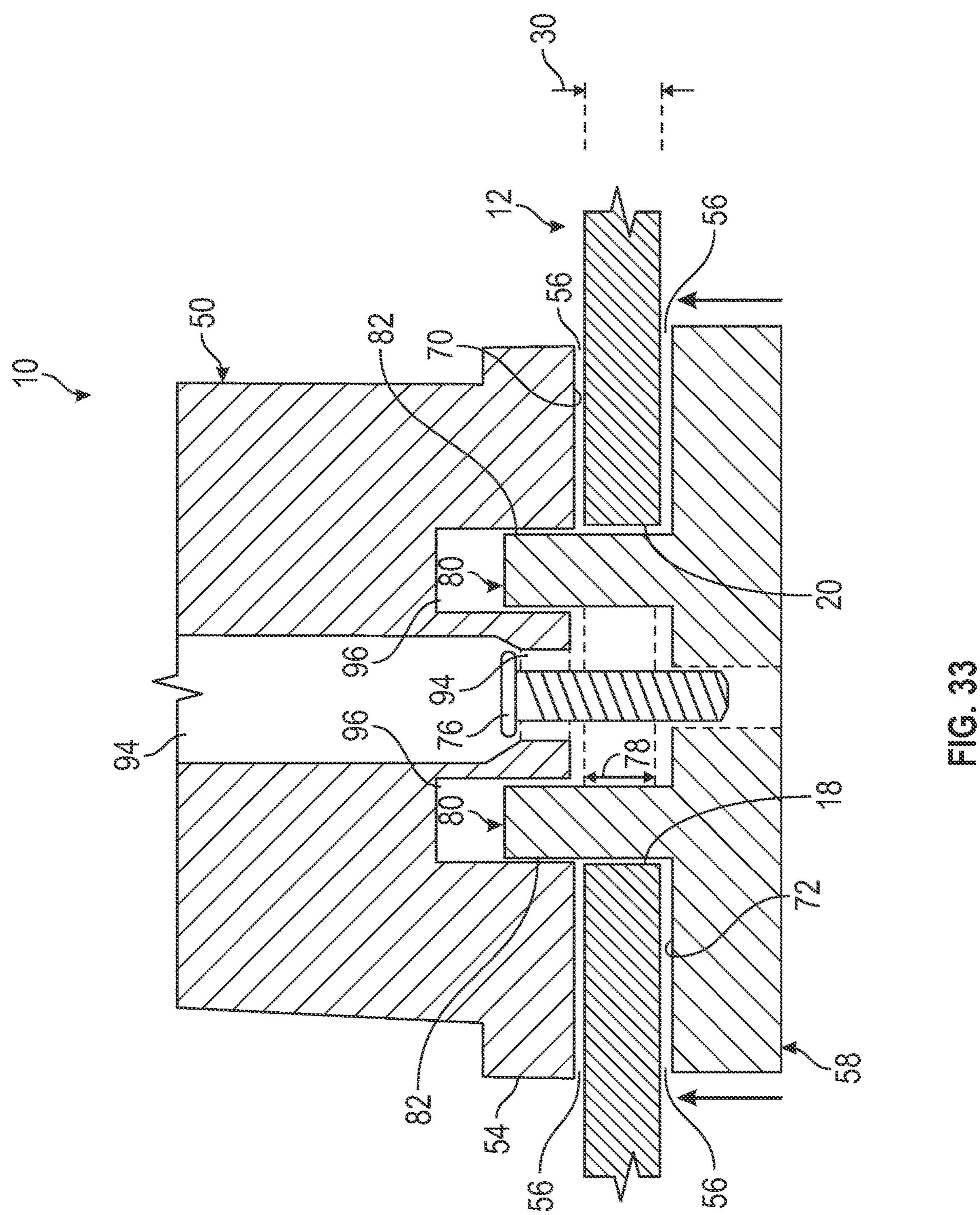
FIG. 33 is a section view showing the mounting plate, mounting track and track mounting end of the modulated mounting attachment, modulated firearm mounting attachment, or modulated firearm accessory mounting attachment shown in accordance with an illustrative aspect of the present invention.
Figure 34:
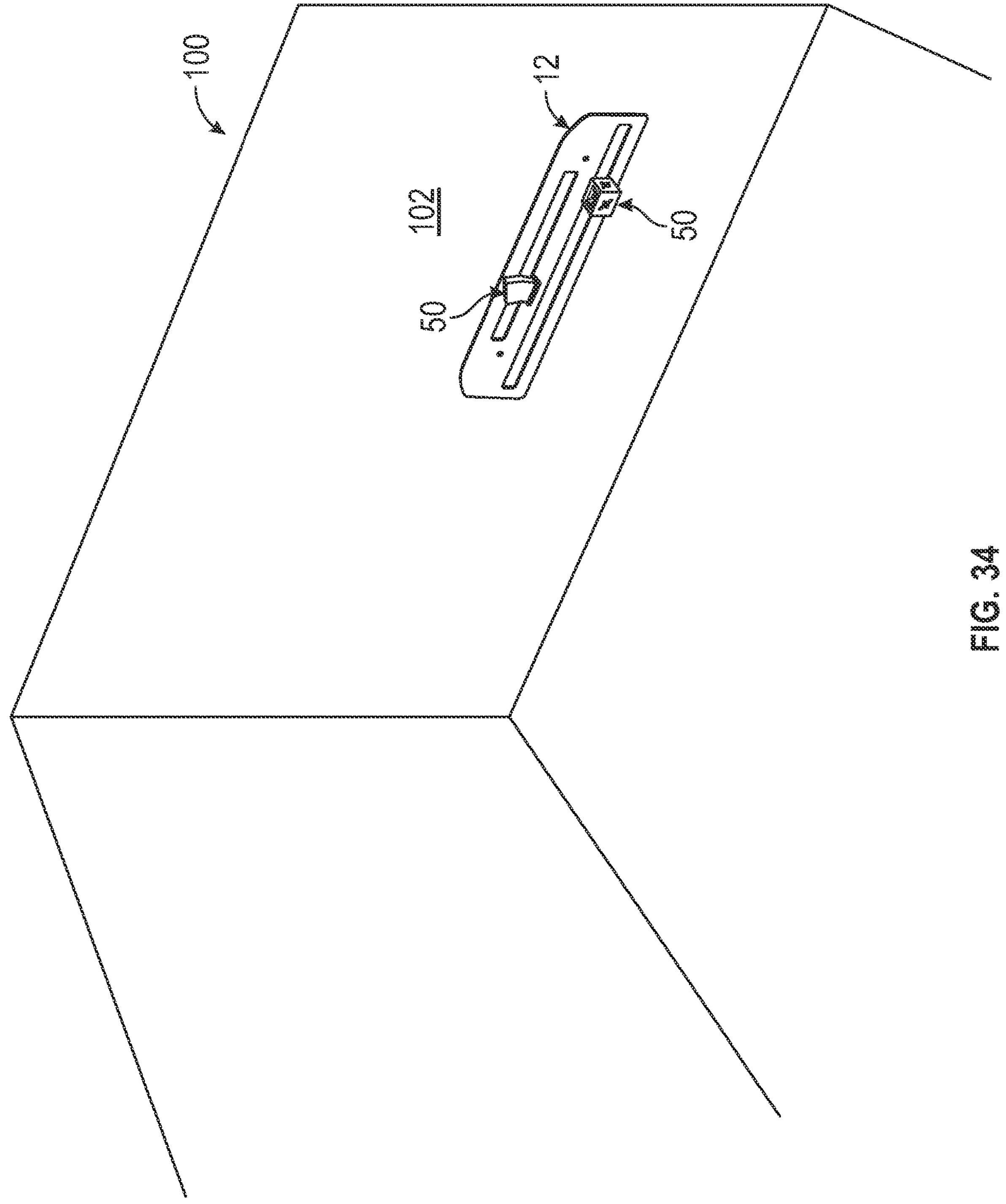
FIG. 34 is a perspective view of the mounting track attached to a wall and the modulated firearm mounting attachment and modulated firearm accessory mounting attachment shown in accordance with an illustrative aspect of the present invention.
Figure 35:
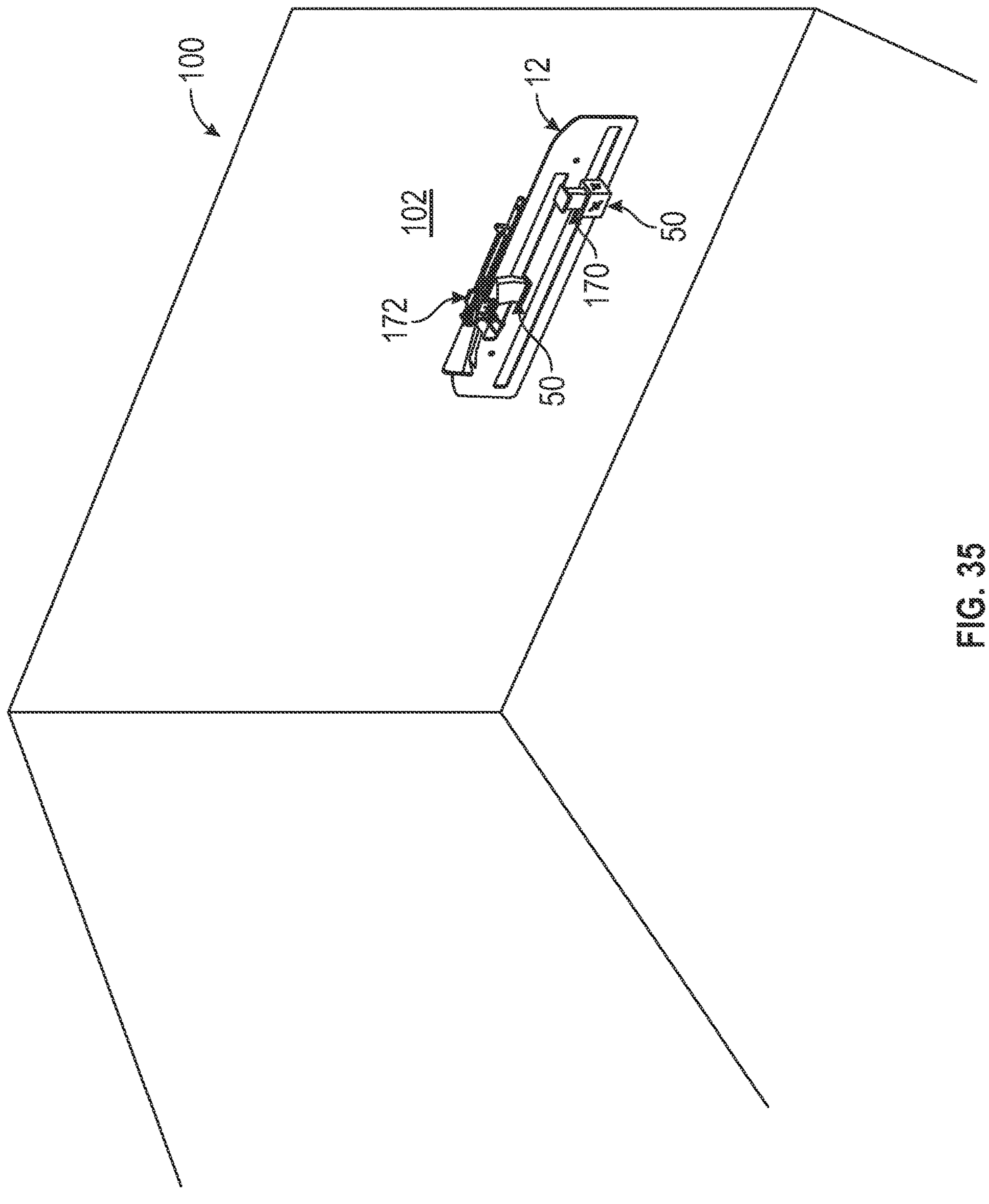
FIG. 35 is a perspective view of the mounting track attached to a wall and the modulated firearm mounting attachment and firearm and modulated firearm accessory mounting attachment and firearm accessory shown in accordance with an illustrative aspect of the present invention.

Modulated mounting track system 10 includes at least one member configured for permanently, semi-permanently, or removably affixing to mounting surface 102 of a storage environment 100. The member in one aspect of the invention may be a mounting track 12, the mounting surface 102 may be a wall, and the storage environment 100 a garage (FIGS. 34-35). The mounting surface 102 and storage environment 100 may be a surface of a workbench, the surface of a storage area, the interior wall surface of a safe, a mounting surface 102 of an electric vehicle 150, such as mounting surface 102 of the front trunk ("frunk") 152 of an electric vehicle 150 (FIGS. 36-37), an interior or exterior surface of a vehicle, such as the interior or exterior surface of law enforcement or military vehicle. Mounting track 12 (FIGS. 1-7 and 32-37) is generally configured as a thin, elongated member housing one or more tracks 14 or openings for removably securing a modulated mounting attachment 50 (FIGS. 8-37) to the mounting track 12. Mounting track 12 can be configured in various sizes, shapes, thicknesses, and from various types of materials suitable for the mounting surface 102 of a storage environment 100 (e.g., wall, bench, frunk, trunk, vehicle interior, safe, etc.). The width, length and edge thickness 30 of the elongated slot 22 for each track 14 can be also configured based on the size and shape of the mounting track 12, installation environment, mounting surface, size and shape of the modulated mounting attachments 50, and size and shape of the accessory 170 being removably stowed in the modulated mounting attachment 50. One or more mounting points 16 may be disposed in the body of or affixed to the mounting track 12 for securing the mounting track 12 to a mounting surface 102 of a storage environment 100. Mounting track 12 is shown having a planar topography; however, the mounting track can be curved (e.g., U-shaped, arcuate-shaped) or bent (e.g., rectilinear shaped such as an L-shape or other shapes, V-shaped) to accommodate the mounting surface 102, storage environment 100, or desired orientation of the modulated mounting attachments 50 and/or stowed accessories relative to the mounting surface 102 of a storage environment 100. For example, one or more mounting points 16 may be disposed in or affixed to a surface of the mounting track 12 having a different orientation from the surface of the mounting track 12 having the one or more tracks 14. The elongated slot 22 of each track 14 includes opposing parallel edges 18 and 20. The length of each elongated slot 22 and the separation distance between the opposing parallel edges 18 and 20 may be configured based on the size and shape of the mounting track 12, installation environment, mounting surface, size and shape of the modulated mounting attachments 50, and size and shape of the accessory 170 being removably stowed in the modulated mounting attachment 50.

Modulated mounting attachment 50 (FIGS. 8-37) may be configured for securely and removably stowing an accessory 170 (e.g., tradesman tools (i.e., construction, electrical, plumbing, welding, est.), safety equipment, first aid equipment/tools, firearms, firearm accessories, etc.) to a mounting track 12 affixed to a mounting surface 102 of a storage environment 100. Modulated mounting attachment 50 includes an accessory docking end 52 having an accessory docking port 74 and a track mounting end 54 having a docking channel 56 configured to removably mate to track 12 between opposing parallel edges 18 and 20 of elongated slot 22. Docking channel 56 is disposed in modulated mounting attachment 50 between accessory docking end 52 and track mounting end 54. In one aspect, docking channel 56 is disposed in modulated mounting attachment 50 between mounting plate 58 and accessory docking port 74. Mounting plate 58 may be integrally formed as part of the modulated mounting attachment 50 or a separate component (FIGS. 28-32) removably attached to the track mounting end 54 of the modulated mounting attachment 50 using a securement 76, such as a bolt and nut, screw, pin, anchor, or collared rod, disposed in securement port 94. Accessory docking port 74 includes, in at least one aspect, a hollow cavity 60 having opposing walls 62 spaced between an opening 64 and opposing bottom surface 66. Hollow cavity 60 may be configured having various shapes, lengths, widths, depths to accommodate various types of accessories 170. One or more of the opposing walls 62 may be configured with an accessory stowage feature 68, such as a track, channel, groove, detent, or other geometry for securing, guiding, and orienting accessory stowage and release movement, and retaining accessory 170. To accommodate and securely stow various sizes and shapes of accessories 170, opposing walls 62 may include one or more arcuate surfaces, may include one or more planar surfaces, and may include one or more arcuate and planer surfaces. Docking channel 56 may be configured having a fixed gap distance 78 between opposing gap surfaces 70 and 72. Docking channel 56 may be configured having an adjustable gap distance 78 between opposing gap surfaces 70 and 72 by increasing/decreasing the gap distance 78 between opposing gap surfaces 70 and 72. In one aspect, track mounting end houses one gap surface 70 and mounting plate 58 houses the other gap surface 72. Increasing the distance between mounting plate 58 and track mounting end 54 increases the gap distance 78 between opposing gap surfaces 70 and 72. Conversely, decreasing the distance between mounting plate 58 and track mounting end 54 decreases the gap distance 78 between opposing gap surfaces 70 and 72. Securement 76 may be configured to increase/decrease gap distance 78. Gap distance is generally equal to or marginally less than the height of opposing edges 18 and 20 of elongated slot 22 of track 14 in mounting track 12. Decreasing gap distance 78 relative to the height of opposing edges 18 and 20 creates a friction fit between the docking channel 56 of modulated mounting attachment 50 and track 14 of mounting track 12. Pins 80 are disposed within docking channel 56. At least one side of pins 80 has an edge 82 being a filleted edge, beveled edge, chamfered edge, or cammed edge. Pins 80 are disposed in the docking channel 56 perpendicular to gap surfaces 70 and 72. Pins 80 are arranged along a diagonal, in an X-shape pattern, in a rectangular pattern, in a box/square pattern. In a preferred aspect, pins 80 are arranged along a diagonal or in an X-shaped pattern. Pins 80 may include a pair of adjoining surfaces 84 arranged in an acute angle relative to each other. Pins 80 may include a pair of adjoining surfaces 84 arranged in an obtuse angle relative to each other. Pins 80 may include a pair of adjoining surfaces 84 arranged in right angle (90 degrees) relative to each other. Gap surface 72 of mounting plate 58 may be configured to carry pins 80 and gap surface 70 of track mounting end 54 of modulated mounting attachment 50 may be configured with pin holes 96, such as concave geometries mirroring the geometry of pins 80 or a concave geometry of sufficient width and depth, for receiving pins 80 when mounting plate 58 and modulated mounting attachment 50 are assembled. Pin holes 96 and securement port 94 may be disposed on any surface of the modulated mounting attachment 50 for controlling mounting orientation of modulated mounting attachment 50 relative to mounting track 12 using one of track mounting sides 98 having pin holes 96 and securement port 94. Modulated mounting attachment 50 has a locked position 86 and an unlocked position 88 to mounting track 12.

In locked position 86, edge 82 of at least one pin 80 engages edge 18 of elongated slot 22 and edge 82 of at least one opposing pin 80 engages opposing edge 20 of elongated slot 22. In unlocked position 88, edge 82 of the least one pin 80 disengages edge 18 of elongated slot 22 and edge 82 of the at least one opposing pin 80 disengages opposing edge 20 of elongated slot 22. In at least one aspect, modulated mounting attachment 50 is moved relative to elongated slot 22 in a locking rotation 90 to lock modulated mounting attachment 50 to mounting track 12. In at least one other aspect, modulated mounting attachment 50 is moved relative to elongated slot 22 in an unlocking rotation 90 to unlock modulated mounting attachment 50 from mounting track 12. Depending on the number and pattern of pins 80, rotation for moving modulated mounting attachment 50 from unlocked position 88 to locked position 86 or from locked position 86 to unlocked position 88 may be up to 90 degrees. In locked position 86, edges 82 of opposing pins 80 contact opposing edges 18 and 20 of elongated slot 22 to prevent further rotation of modulated mounting attachment 50 relative to elongated slot 22 and to place modulated mounting attachment 50 in locked position 86 relative to elongated slot 22 of track 14. In one aspect, increasing the number of pins 80 decreases the required amount of rotation to move the modulated mounting attachment from unlocked position 88 to locked position 86 and conversely, from locked position 86 to unlocked position 88. In at least one aspect, the furthest distance between opposing pins 80 engaging opposing edges 18 and 20 of elongated slot is generally equal to or marginally greater than the separation distance 24 between opposing edges 18 and 20 of elongated slot to stop rotation of modulated mounting attachment 50 and provide a friction fit between edges 82 of opposing pins 80 and opposing edges 18 and 20 of elongated slot 22. Decreasing gap distance 78 of docking channel 56 relative to the height of opposing edges 18 and 20 increases a friction fit between the opposing gaps surfaces 70 and 72 of docking channel 56 of modulated mounting attachment 50 and opposing track surfaces 26 and 28 adjacent elongated slot 22 of track 14 of mounting track 12. Conversely, increasing gap distance 78 of docking channel 56 relative to the height of opposing edges 18 and 20 decreases the friction fit between the opposing gaps surfaces 70 and 72 of docking channel 56 of modulated mounting attachment 50 and opposing track surfaces 26 and 28 adjacent elongated slot 22 of track 14 of mounting track 12.

Figure 36:
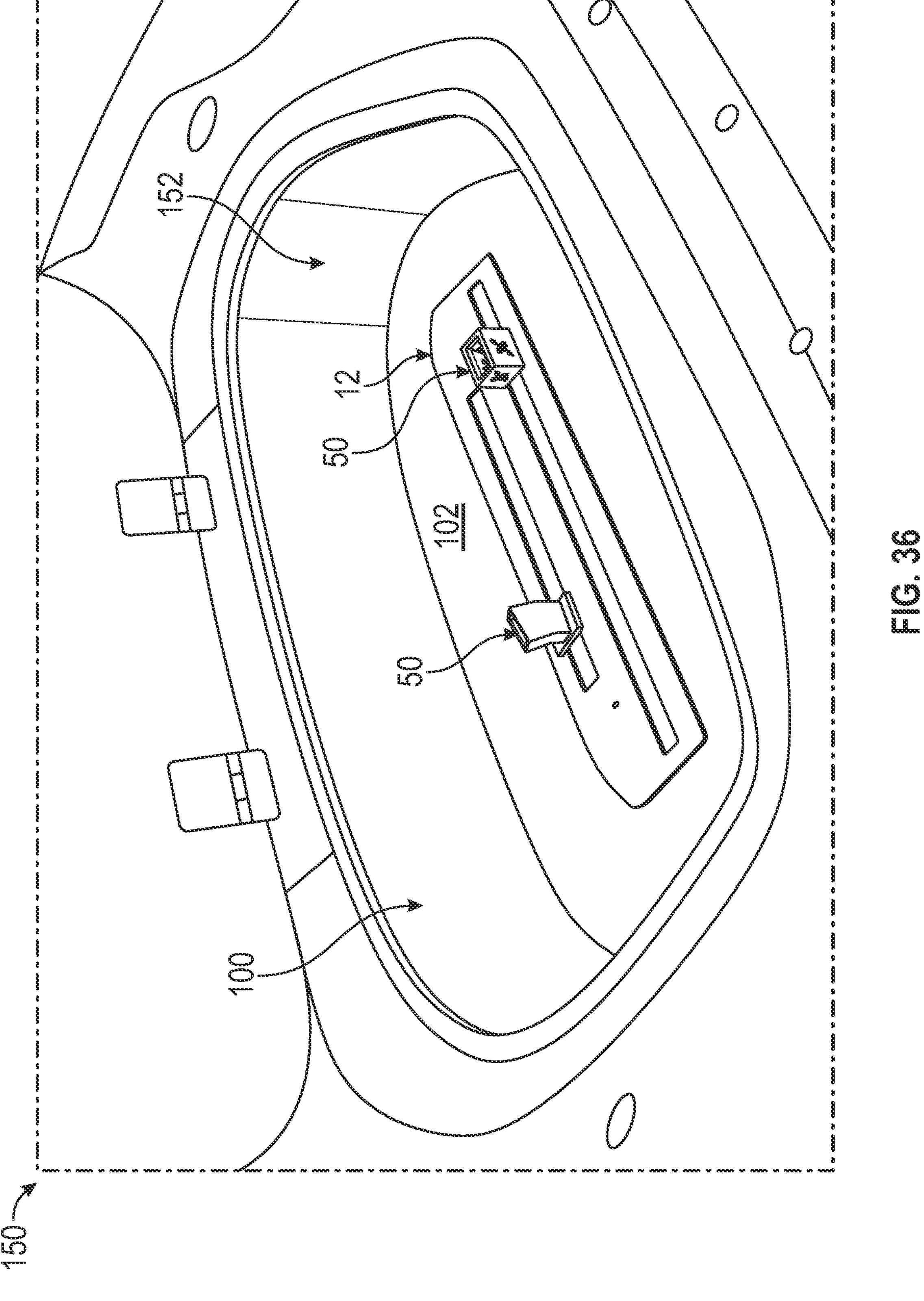
FIG. 36 is a perspective view of the mounting track attached within the frunk of an EV and the modulated firearm mounting attachment and modulated firearm accessory mounting attachment shown in accordance with an illustrative aspect of the present invention.
Figure 37:
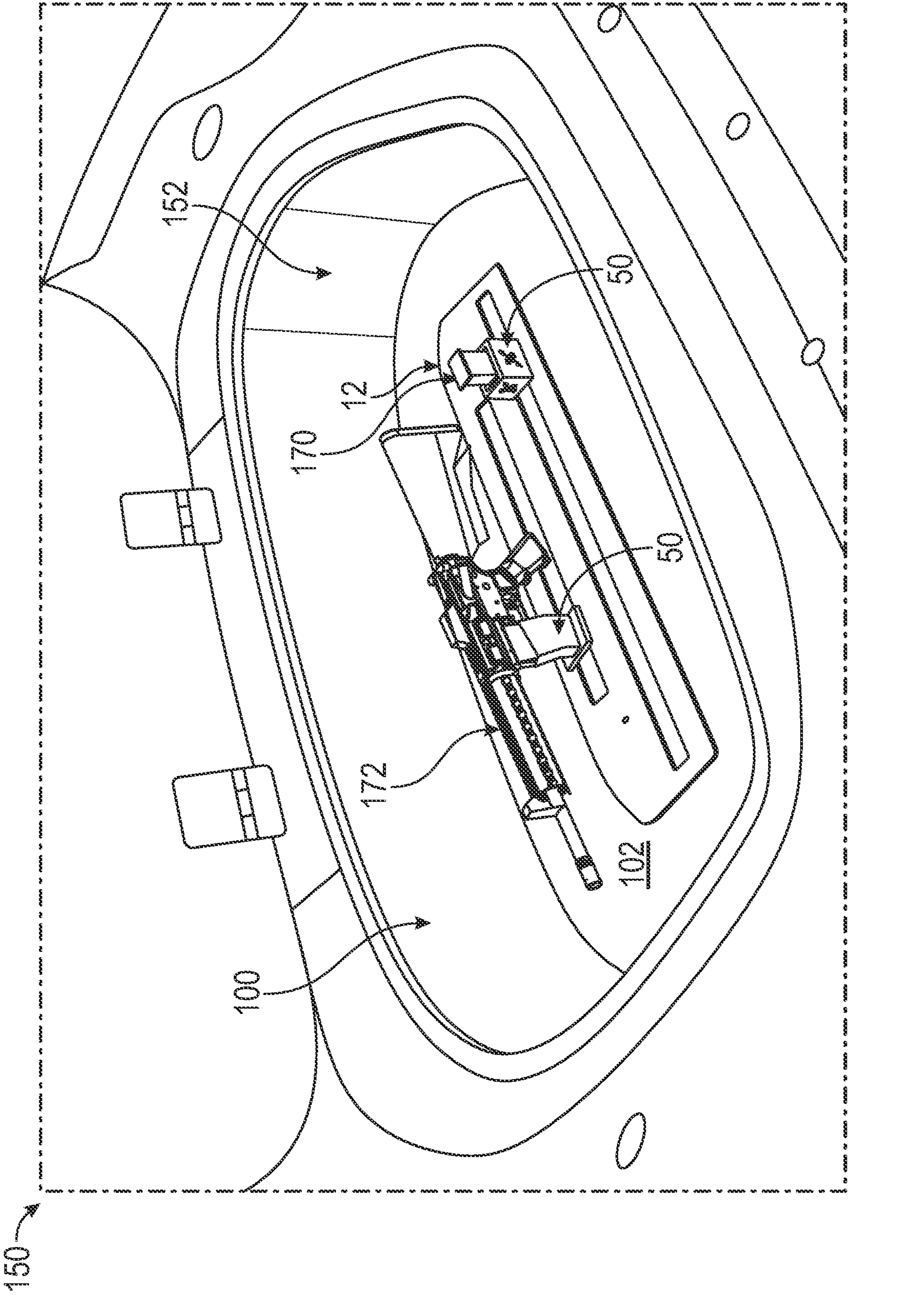
FIG. 37 is a perspective view of the mounting track attached within the frunk of an EV and the modulated firearm mounting attachment and firearm and the modulated firearm accessory mounting attachment and firearm accessory shown in accordance with an illustrative aspect of the present invention.

A storage environment 100 may be a garage wall or bench and mounting surface 102 may be a wall surface or bench surface as shown in FIGS. 34-35. In one aspect, a storage environment 100 may be a vehicle interior, trunk, bed, or frunk and mounting surface 102 may be an interior surface of the vehicle, trunk, or frunk. In one aspect, a storage environment 100 may be an electric vehicle interior, electric vehicle trunk, electric vehicle bed, or electric vehicle frunk and mounting surface may be any surface of an electric vehicle interior, electric vehicle trunk, electric vehicle bed, or electric vehicle frunk as shown in FIGS. 36-37. In one aspect, a storage environment 100 may be a military vehicle or law enforcement vehicle and mounting surface 102 may be any surface of a military vehicle or law enforcement vehicle.

Modulated mounting attachment 50 may be a modulated firearm mounting attachment configured to removably and securely stow a firearm 172, such as by securing a portion of the firearm 172 in docking port 74. For example, the grip or handle of firearm 172 may be removably and securely stowed in docking port 74. In one aspect, modulated mounting attachment 50 may be a modulated firearm accessory mounting attachment configured to removably and securely stow a firearm accessory 170, such as by securing a portion of the firearm accessory 170 in accessory docking port 74. For example, a magazine, slide of a firearm, firearm grip, or other portion of the firearm may be removably and securely stowed in accessory docking port 74. Other accessories are also contemplated, such as removably and securely stowing a conducted energy device or conductive energy weapon (e.g., electroshock device/weapon).

Orientation of an accessory or any item stowed in accessory docking port 74 may be changed by altering the mounting orientation of mounting track 12 or the surface of modulated mounting attachment 50 secured to mounting track 12. For example, if mounting surface 102 within storage environment 100 is vertical, pin holes 96 and securement port 94 on one of track mounting sides 98 having gap surface 70 of modulated mounting attachment 50 may be removably secured to mounting plate 58. Conversely, if mounting surface 102 within storage environment 100 is horizontal, pin holes 96 and securement port 94 on track mounting end 54 having gap surface 70 of modulated mounting attachment 50 may be removable secured to mounting plate.

The invention is not to be limited to the particular embodiments described herein. In particular, the invention contemplates numerous variations in a modulated mounting track system and method. The foregoing description has been presented for purposes of illustration and description. It is not intended to be an exhaustive list or limit any of the invention to the precise forms disclosed. It is contemplated that other alternatives or exemplary aspects are considered included in the invention. The description is merely examples of embodiments, processes or methods of the invention. It is understood that any other modifications, substitutions, and/or additions can be made, which are within the intended spirit and scope of the invention.

What is claimed is:

1. A modulated mounting track system, comprising:

a mounting track comprising an elongated rail having at least one elongated slot and one or more mounting points;

a mounting attachment comprising an accessory docking port terminating in a track mounting end having a docking channel configured to removably mate with the elongated slot in the mounting track, at least one protrusion disposed within the docking channel, the at least one protrusion arranged generally perpendicular to the docking channel and having at least one surface for mating against an edge of the elongated slot for locking the mounting attachment in position relative to the track wherein the mounting attachment comprises a locked and an unlocked position for removably mating the mounting attachment to the mounting track and to secure the mounting attachment from being unintentionally dislodged.

2. The modulated mounting track system of claim 1, wherein the at least one protrusion comprises opposing, the opposing pins arranged perpendicular to the docking channel and having at least one cammed surface for mating against opposing edges of the elongated slot.

3. The modulated mounting track system of claim 1, wherein the docking channel having a gap distance that approximates the thickness of the opposing edges of the elongated slot.

4. The modulated mounting track system of claim 3, wherein the gap distance of the docking channel is adjustable for controlling an amount of friction between the docking channel and the opposing edges of the elongated slot.

5. The modulated mounting track system of claim 1, wherein the accessory docking port is configured to removably receive and secure a magazine or a portion of a firearm.

6. The modulated mounting track system of claim 1, wherein the accessory docking port comprises a hollow opening configured to removably receive and secure a portion of a firearm or a firearm accessory.

* * * * *